United States Patent
Yoon

(10) Patent No.: US 8,897,636 B2
(45) Date of Patent: Nov. 25, 2014

(54) OPTICAL NETWORK TERMINAL

(75) Inventor: Chang Il Yoon, Seoul (KR)

(73) Assignee: Ubiquoss, Inc., Seoul (KR)

( * ) Notice: Subject to any disclaimer, the term of this patent is extended or adjusted under 35 U.S.C. 154(b) by 85 days.

(21) Appl. No.: 13/494,508

(22) Filed: Jun. 12, 2012

(65) Prior Publication Data

US 2012/0315041 A1    Dec. 13, 2012

(30) Foreign Application Priority Data

Jun. 13, 2011  (KR) .......................... 10-2011-0056995

(51) Int. Cl.
*H04B 10/08*    (2006.01)
*H04B 10/272*   (2013.01)

(52) U.S. Cl.
CPC .......... *H04B 10/272* (2013.01); *H04B 2210/08* (2013.01)
USPC ................ 398/15; 398/23; 398/141; 398/182

(58) Field of Classification Search
CPC ...... H04B 10/00; H04B 10/08; H04B 10/272; H04B 10/142; H04B 10/27; H04B 10/07
See application file for complete search history.

(56) References Cited

U.S. PATENT DOCUMENTS

| | | | | |
|---|---|---|---|---|
| 5,940,199 A | * | 8/1999 | Yoshida ........................ | 398/191 |
| 6,108,112 A | * | 8/2000 | Touma ............................ | 398/10 |
| 2009/0274471 A1 | * | 11/2009 | Bowler et al. ................. | 398/197 |
| 2010/0127627 A1 | * | 5/2010 | Zhu et al. ...................... | 315/149 |

* cited by examiner

*Primary Examiner* — Ken Vanderpuye
*Assistant Examiner* — David Lambert
(74) *Attorney, Agent, or Firm* — Levenfeld Pearlstein, LLC

(57) ABSTRACT

Disclosed herein is an optical network terminal. The Optical Network Terminal (ONT) includes a laser diode for generating an optical signal to be transmitted to the OLT. A laser diode driving unit supplies driving current required for light emission of the laser diode. A driving current detection unit detects the driving current. A light emission time determination unit calculates a light emission time of the laser diode depending on a time for which the driving current is detected, and outputs a power control signal including information about results of a comparison between the light emission time of the laser diode and a preset reference time. A power supply voltage control unit interrupts a power supply voltage of the laser diode driving unit when the power control signal includes information indicating that the light emission time of the laser diode is longer than the reference time.

4 Claims, 4 Drawing Sheets

OPTICAL NETWORK TERMINAL

CROSS REFERENCE TO RELATED APPLICATION

The present application claims priority from Korean Patent Application Number 10-2011-0056995 filed on Jun. 13, 2011, the entire contents of which application are incorporated herein for all purposes by this reference.

BACKGROUND OF THE INVENTION

1. Field of the Invention

The present invention relates, in general, to an optical network terminal, and, more particularly, to an optical network terminal, which can prevent a laser diode from continuously emitting light and seizing time slots, allocated to other optical network terminals, due to a fault or malfunction.

2. Description of the Related Art

Generally, a passive optical network is one of optical subscriber construction schemes for providing an optical fiber-based high-speed service to businesses or normal homes, and may include a single Optical Line Terminal (OLT) and a plurality of Optical Network Terminals (ONTs) connected thereto.

A passive optical network may be constructed using a Time Division Multiplexing (TDM) scheme. In such a TDM passive optical network, in order to implement an upstream procedure that transmits data from ONTs to an OLT, a scheme is used in which respective time slots are allocated to a plurality of ONTs and each ONT transmits light to the OLT in its own time slot.

In the TDM passive optical network, the case where a laser diode that generates light continuously emits light due to a fault or malfunction of the ONT occurs. In this case, a problem arises in that the ONT in which the fault or malfunction has occurred seizes time slots of other ONTs of the passive optical network to which it belongs, as well as its own time slot, due to the continuous light emission, thus making it impossible to allow ONTs which perform normal operations to transmit data. Further, there is a problem in that the OLT cannot receive data from ONTs other than the ONT in which the fault or malfunction has occurred, so that it determines that all of the ONTs connected to the OLT are faulty.

SUMMARY OF THE INVENTION

Accordingly, the present invention has been made keeping in mind the above problems occurring in the prior art, and an object of the present invention is to provide an optical network terminal, which can prevent a laser diode from continuously emitting light and seizing time slots, allocated to other optical network terminals, due to a fault or malfunction.

In order to accomplish the above object, the present invention provides an Optical Network terminal (ONT) connected to an Optical Line Terminal (OLT) in a passive optical network, including a laser diode for generating an optical signal to be transmitted to the OLT; a laser diode driving unit for supplying driving current required for light emission of the laser diode; a driving current detection unit for detecting the driving current; a light emission time determination unit for calculating a light emission time of the laser diode depending on a time for which the driving current is detected, and outputting a power control signal including information about results of a comparison between the light emission time of the laser diode and a preset reference time; and a power supply voltage control unit for interrupting a power supply voltage of the laser diode driving unit when the power control signal includes information indicating that the light emission time of the laser diode is longer than the reference time.

In an embodiment of the present invention, the driving current detection unit may include a detection resistor connected in series with the laser diode, and a comparator configured to compare voltages at both ends of the detection resistor with each other and output a resulting output voltage.

In an embodiment of the present invention, the driving current detection unit may further include a switching element for switching its state between an open state and a short state in response to the output voltage of the comparator, and the driving current detection unit may output a high-level signal or a low-level signal indicating that the driving current has been detected depending on switching of the state of the switching element.

In an embodiment of the present invention, the light emission time determination unit may include a clock generation unit for generating clocks, and a counter for counting a number of the clocks generated by the clock generation unit while the driving current is being detected by the driving current detection unit, comparing a counted number of clocks with a reference number of clocks corresponding to the reference time, and then outputting the power control signal.

In particular, in an embodiment in which the driving current detection unit outputs the high-level signal or the low-level signal indicating that the driving current has been detected depending on switching of the state of the switching element, the counter may count the number of the clocks generated by the clock generation unit while the high-level signal or the low-level signal is being output, compare a counted number of clocks with a reference number of clocks corresponding to the reference time, and then output the power control signal.

In an embodiment of the present invention, the power supply voltage control unit may include a switching element for supplying or interrupting power of the laser diode driving unit in response to the power control signal.

According to the present invention, a laser diode can be prevented from continuously emitting light and seizing time slots, allocated to other optical network terminals, due to a fault or malfunction.

In particular, the present invention adopts a scheme for detecting driving current supplied to a laser diode rather than detecting light generated by the laser diode, so that a photodiode for detecting light is not required, and the problem of a failure in the detection of light emission by the laser diode due to the abnormality of the photodiode can be solved.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings. The embodiments of the present invention may be modified in various forms, and the scope of the present invention is not limited by the following embodiments, which will be described later. The embodiments of the present invention are provided to fully describe the present invention to those having ordinary knowledge in the art to which the present invention pertains. The terms described in the present specification are defined in consideration of functions of the present invention and may vary depending on the intention or usage of those skilled in the art. Therefore, the terms should not be understood to limit the technical components of the present invention.

First, a Passive Optical Network (PON) to which an Optical Network Terminal (ONT) according to an embodiment of the present invention is applied will be described in brief.

Figure 1:
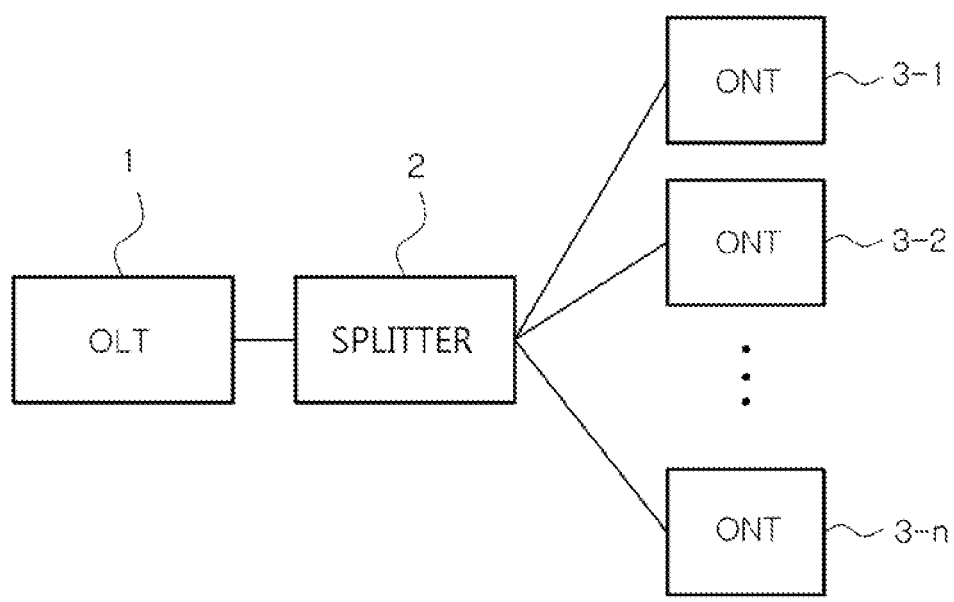
FIG. 1 is a configuration diagram showing a passive optical network to which an optical, network terminal according to an embodiment of the present invention is applied.

FIG. 1 is a configuration diagram showing a PON to which an ONT according to an embodiment of the present invention is applied.

As shown in FIG. 1, the PON is one of optical subscriber construction schemes which provide an optical fiber-based high-speed service to businesses or normal homes, and employs a scheme in which a plurality of ONTs 3-1 to 3-n can be connected to a single Optical Line Terminal (OLT) 1 via a splitter 2.

PONs are classified into TDM-PONs using a Time Division Multiplexing (TDM) scheme and WDM-PONs using a Wavelength Division Multiplexing (WDM) scheme. TDM-PONs include an ATM-PON using Asynchronous Transfer Mode (ATM), an E-PON based on the Ethernet, and a Gigabit-capable PON (G-PON) using a normal frame protocol.

The operation of a TDM-PON using a TDM scheme is described below. In a downstream procedure in which data is transferred from the OLT 1 to the ONTs 3-1 to 3-n, the OLT 1 inserts the identifiers of registered ONTs 3-1 to 3-n into the preambles of frames and then transmits the frames. The ONTs 3-1 to 3-n receive only frames having their own identifiers. Further, in an upstream procedure in which data is transferred from the ONTs 3-1 to 3-n to the OLT 1, the OLT 1 allocates upstream time slots to all of the ONTs 3-1 to 3-n, and each of the ONTs 3-1 to 3-n transmits data to the OLT 1 in the time slot allocated thereto.

In the above-described upstream procedure, when a fault occurs in a relevant ONT and then a laser diode continuously emits light, a problem may arise in that the ONT in which the fault has occurred seizes all of the upstream time slots, thus not only making it impossible for other ONTs to transmit data to the OLT, but also causing the OLT to determine that other OLTs in which the fault did not occur have not made correct responses.

Therefore, the present invention is intended to detect early the continuous light emission performed by a laser diode due to the occurrence of a fault in an ONT and to shut down the optical module of the ONT in which the fault has occurred, thus actively operating the PON.

Figure 2:
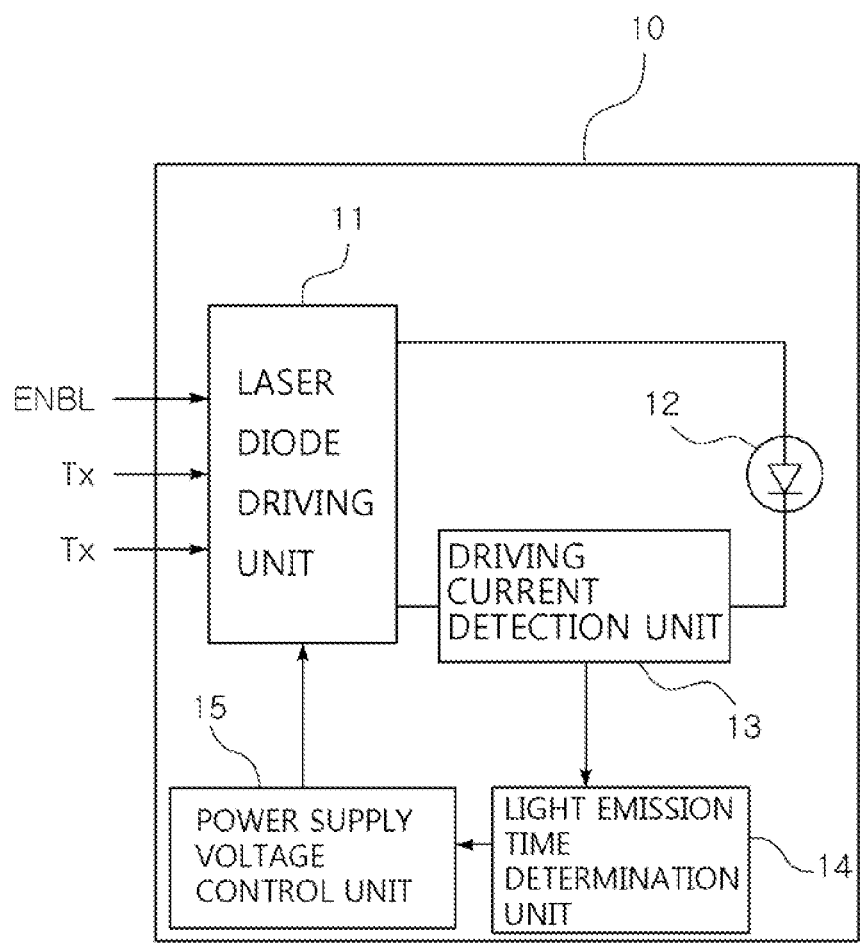
FIG. 2 is a configuration diagram showing an optical network terminal according to an embodiment of the present invention.

FIG. 2 is a configuration diagram showing an Optical Network Terminal (ONT) according to an embodiment of the present invention.

As shown in FIG. 2, an ONT 10 according to an embodiment of the present invention may include a laser diode 12, a laser diode driving unit 11, a driving current detection unit 131, a light emission time determination unit 14, and a power supply voltage control unit 15.

The laser diode 12 is an element for generating light that is transmitted to the OLT of the passive optical network, and may be manufactured using various types of semiconductor materials. The laser diode 12 is an element configured such that a voltage is applied between two electrodes and driving current is caused to flow through the electrodes and then laser oscillation is induced by an optical resonator formed in a semiconductor device. In order to emit light, driving current having high current density is required.

The laser diode driving unit 11 supplies driving current required for the light emission of the laser diode 12. The laser diode driving unit 11 is activated in response to the input of a burst mode enable signal ENBL, and generates and supplies the driving current to the laser diode 12 so that the laser diode 12 generates an optical signal corresponding to data Tx desired to be transmitted. Accordingly, while the laser diode 12 is emitting light, the driving current is supplied to the laser diode 12 by the laser diode driving unit 11.

Further, the laser diode driving unit 11 is supplied with a power supply voltage to be operated, and is shut down when the input of the power supply voltage is interrupted, so that the supply of the driving current to the laser diode 12 may be interrupted.

The driving current detection unit 13 is connected in series with the laser diode 12, and is capable of detecting current flowing through the laser diode 12.

Figure 3:
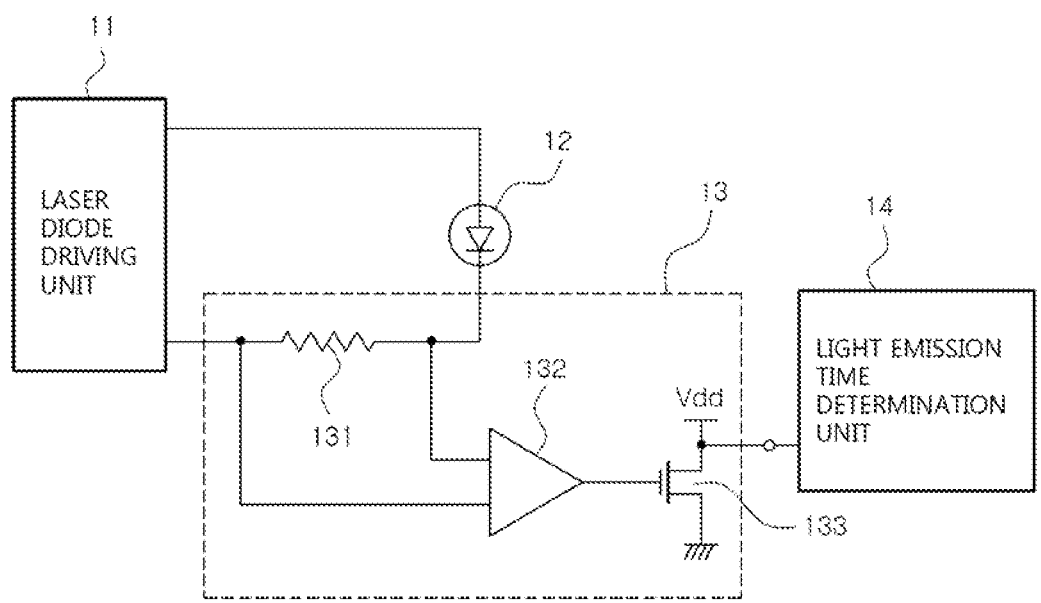
FIG. 3 is a circuit diagram showing in detail the driving current detection unit of the optical network terminal according to an embodiment Of the present invention.

FIG. 3 is a circuit diagram showing in detail the driving current detection unit of the ONT according to an embodiment of the present invention.

Referring to FIG. 3, the driving current detection unit 13 may include a detection resistor 131 connected in series with the laser diode 12 and a comparator 132 configured to receive voltages at both ends of the detection resistor 131 and compare the voltages with each other. In addition, the driving current detection unit 13 may further include a switching element 133 for switching its state between an open state and a short state in response to the output voltage of the comparator 132.

The laser diode 12 emits light when the driving current flows through the laser diode 12. Therefore, the driving current detection unit 13 is connected in series with the laser diode 12 and detects whether driving current flows through the laser diode 12. For this operation, the detection resistor 131 is connected in series with the laser diode 12, so that when the driving current flows through the laser diode 12, a voltage drop is generated between the voltages at both ends of the detection resistor 131. That is, when the driving current flows through the laser diode 12 and the laser diode 12 emits light, a voltage drop is generated between both ends of the detection resistor 131.

The comparator 132 receives the voltages at both ends of the detection resistor 131 and outputs a voltage corresponding to a difference between the two voltages. When the laser diode 12 does not emit light, the driving current does not flow, and thus the output voltage of the comparator 132 is not present. Therefore, the driving current detection unit 13 may display information indicating whether the driving current has been detected using the output of the comparator 132.

In an embodiment of the present invention, the switching element 133 may be used to output information, indicating whether the driving current has been detected, as a high-level signal or a low-level signal so that the driving current detection unit 13 can more precisely display information indicating whether the driving current has been detected and the light emission time determination unit 14 can more easily apply a signal indicative of the detection of the driving current.

As shown in FIG. 3, the driving current detection unit 13 may output a high-level signal or a low-level signal via the switching element 133 that is controlled in response to the voltage of the output terminal of the comparator 132. For example, when the driving current flows through the laser diode 12 and the laser diode 12 emits light, the output voltage of the comparator 132 is generated due to the voltages at both ends of the detection resistor 131, so that the switching element 133 enters a short state, and thus the driving current detection unit 13 can output a low-level signal. In contrast, when the driving current does not flow through the laser diode 12, a difference between the voltages at both ends of the detection resistor 131 is not present, so that the output voltage of the comparator 132 is not generated. Accordingly, the switching element 133 enters an open state, so that the driving current detection unit 13 can output a high-level signal that is a power supply voltage Vdd. The embodiment of FIG. 3 shows an example in which if the driving current is detected, a low-level signal is output, whereas if the driving current is not detected, a high-level signal is output. However, the configuration of this example may be modified so that reversed signals are output.

The high-level signal or the low-level signal output from the driving current detection unit 13 may be input to the light emission time determination unit, 14 and may be used to detect the duration (time) of light emission performed by the laser diode 12.

The light emission time determination unit 14 calculates the light emission time of the laser diode 12 depending on the time for which the driving current is detected, and outputs a power control signal including information about the results of a comparison between the light emission time of the laser diode 12 and a preset reference time.

The power supply voltage control unit 15 shuts down the laser diode driving unit 11 by interrupting the power supply voltage thereof if the power control signal output from the light emission time determination unit 14 includes information indicating that the light emission time of the laser diode 12 is longer than the reference time.

Figure 4:
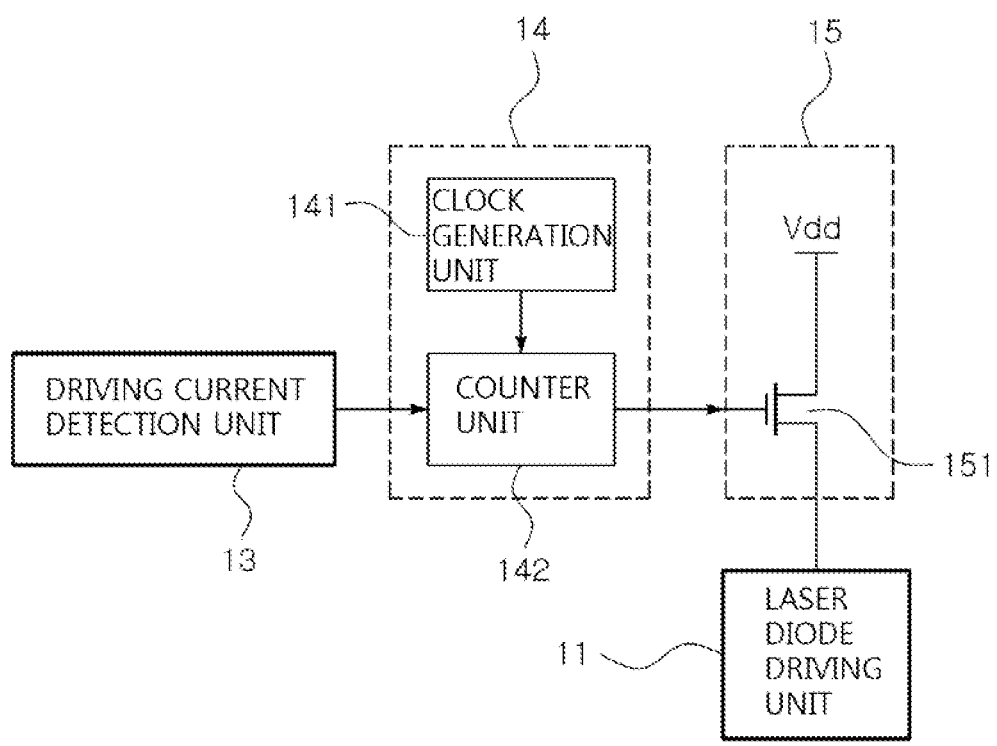
FIG. 4 is a circuit diagram showing in detail the light emission time determination unit and the power supply voltage control unit of the optical network terminal according to an embodiment of the present invention.

FIG. 4 is a circuit diagram showing in detail the light emission time determination unit and the power supply voltage control unit of the ONT according to an embodiment of the present invention.

As shown in FIG. 4, the light emission time determination unit 14 may include a clock generation unit 141 and a counter unit 142.

The clock generation unit 141 generates clocks having a predetermined frequency. The detailed construction of the clock generation unit 141 is well known to the art of this invention, and thus a detailed description thereof will be omitted here.

The counter unit 142 counts the number of the clocks while the driving current is being detected by the driving current detection unit 13. For example, when the driving current detection unit 13 is configured as shown in FIG. 3, and outputs a low-level signal while the driving current is flowing, the counter unit 142 may count the number of clocks output from the clock generation unit 141 while receiving the low-level signal from the driving current detection unit 13. Then, the counter unit 142 compares the counted number of clocks with the preset reference number of clocks, and then outputs a power control signal based on the results of the comparison.

The reference number of clocks may be determined in accordance with the above-described reference time. That is, when the number of clocks counted while the driving current is being detected is less than the reference number of clocks, it can be determined that the time for which the driving current is flowing (that is, the time for which the laser diode emits light) is shorter than the reference time. In contrast, when the number of clocks counted while the driving current is being detected is greater than the reference number of clocks, it can be determined that the time for which the driving current is flowing (that is, the time for which the laser diode emits light) is longer than the reference time. In this way, the reference number of clocks is a concept corresponding to the reference time, and can be determined according to the reference time.

The power control signal output from the counter unit 142 can be understood to include information about the results of a comparison between the counted number of clocks and the reference number of clocks. For example, when the counted number of clocks is greater than the reference number of clocks, the power control signal output from the counter unit 142 may become a low-level signal, whereas when the counted number of clocks is less than the reference number of clocks, the power control signal may become a high-level signal. This power control signal is input to the power supply voltage control unit 15.

The power supply voltage control unit 15 supplies or interrupts the power supply voltage of the laser diode driving unit 11 in response to the power control signal output from the light emission time determination unit 14. That is, when the power control signal output from the light emission time determination unit 14 includes information indicating that the light emission time of the laser diode 12 is longer than the reference time, the power supply voltage control unit 15 shuts down the laser diode driving unit 11 by interrupting the power supply voltage of the laser diode driving unit 11. By way of this operation, the laser diode can be prevented in advance from emitting light for a time longer than the time slot due to a fault or malfunction.

The power supply voltage control unit 15 may include a switching element 151 that is shorted or opened in response to the power control signal. For example, when the power control signal output from the counter unit 142 is a low-level signal that is output in the case where the counted number of clocks is greater than the reference number of clocks, the switching element 151 enters an open state, thus interrupting the supply of the power supply voltage Vdd to the laser diode driving unit 11.

In FIGS. 3 and 4, switching elements 133 and 151 are shown as being Field Effect Transistors (FETs), but are not limited thereto and may be replaced by Bipolar Junction Transistors (BJT) or other types of transistors that are well known to the art of this invention.

As described above, the present invention can prevent a laser diode from continuously emitting light and seizing time slots, allocated to other optical network terminals, due to a fault or malfunction.

In particular, the present invention adopts a scheme for detecting driving current supplied to a laser diode rather than detecting light generated by the laser diode, so that a photodiode for detecting light is not required, and the problem of a failure in the detection of light emission by the laser diode due to the abnormality of the photodiode can be solved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An Optical Network terminal (ONT) connected to an Optical Line Terminal (OLT) in a passive optical network, comprising:
- a laser diode for generating an optical signal to be transmitted to the OLT;
- a laser diode driving unit for supplying driving current required for light emission of the laser diode;
- a driving current detection unit for detecting the driving current;
- a light emission time determination unit for calculating a light emission time of the laser diode depending on a time for which the driving current is detected, and outputting a power control signal including information about results of a comparison between the light emission time of the laser diode and a preset reference time; and
- a power supply voltage control unit for interrupting a power supply voltage of the laser diode driving unit when the power control signal includes information indicating that the light emission time of the laser diode is longer than the reference time;
- wherein the driving current detection unit comprises a detection resistor connected in series with the laser diode, and a comparator configured to compare voltages at both ends of the detection resistor with each other and output a resulting output voltage;
- wherein the driving current detection unit further comprises a switching element for switching its state between an open state and a short state in response to the output voltage of the comparator, and the driving current detection unit outputs a high-level signal from a power supply in the open state or a low-level signal from ground in the short state to indicate that the driving current has been detected depending on switching of the state of the switching element.

2. The ONT according to claim 1, wherein the light emission time determination unit comprises:
- a clock generation unit for generating clocks; and
- a counter for counting a number of the clocks generated by the clock generation unit while the driving current is being detected by the driving current detection unit, comparing a counted number of clocks with a reference number of clocks corresponding to the reference time, and then outputting the power control signal.

3. The ONT according to claim 1, wherein the light emission time determination unit comprises:
- a clock generation unit for generating clocks; and
- a counter for counting a number of the clocks generated by the clock generation unit while the high-level signal or the low-level signal indicating that the driving current has been detected is being output from the driving current detection unit, comparing a counted number of clocks with a reference number of clocks corresponding to the reference time, and then outputting the power control signal.

4. The ONT according to claim 1, wherein the power supply voltage control unit comprises a switching element for supplying or interrupting power of the laser diode driving unit in response to the power control signal.

* * * * *